United States Patent Office 2,984,640
Patented May 16, 1961

2,984,640

WEATHER RESISTANT, FIRE RETARDANT PAINT CONTAINING CHLORINE-CONTAINING ORGANIC POLYMER, AND A SPUMIFIC

Benjamin B. Kaplan, West Hartford, Conn., assignor to Albi Manufacturing Company, Inc., Rockville, Conn., a corporation of Connecticut No Drawing. Filed Dec. 6, 1956, Ser. No. 626,587

10 Claims. (Cl. 260—33.4)

This invention relates to a fire- and heat-retardant composition and pertains more specfically to an improved composition adapted for coating a surface, particularly the surface of wood and other combustible or incombustible materials, to provide a protective film or paint capable of intumescence upon exposure to elevated temperatures and hence capable of heat insulating the underlying material.

Intumescent fire-retardant and heat-retardant paints are well known to the art, and usually such paints consist essentally of a film-forming material, a carbonaceous material, and a spumific agent. When exposed to elevated temperatures such as a flame, carbonization and intumescence occur, producing a characteristic puff which serves as a protective insulating layer. Although these prior art coating compositions provide effective heat protection, they have in general been deficient in that one or more of the ingredients, usually the spumific, have been at least initially water soluble, so that the coatings have not been sufficiently weather-proof for wide use on exterior surfaces. The water-soluble ingredients tend to leach out upon weathering. Or, one or more ingredients is so strongly acidic or alkaline as to be destructive of many surfaces on which it is desired to be used.

One object of the present invention is to provide a fire-retardant, intumescent composition free from ingredients which possess substantial water solubility or strongly acidic or alkaline properties.

Another is to provide a fire-retardant, intumescent composition of improved water-insolubility and having weather resistance sufficient to classify the composition as an all-around, first-class outside paint.

Still another object is to provide a composition of the type described including a film-forming ingredient which is itself reactive when exposed to elevated temperatures to liberate a hydrogen halide, which in turn facilitates carbonization of the carbonaceous material present in the composition and avoids the necessity for having any other or additional acidic material present.

Other and further objects will be apparent from the description which follows.

According to this invention, the acid requirement for the formation of a suitably puffable carbonaceous mass from the carbonaceous materials used is supplied by the inclusion of an organic film-former which releases acid at elevated temperature. Since this acid requirement can thereby be satisfied, the spumific can be chosen without regard to any necessity for acid-supplying requirements, thus permitting the use of a relatively water-insoluble, non-leaching organic spumific.

The objectives of this invention are achieved in a composition constituted of a film-forming, halogen-containing organic material which liberates a hydrogen halide upon exposure to elevated temperates, a relatively low molecular weight polyhydroxy alcohol of low water solubility as the carbonaceous material, and a water-insoluble organic spumific such as dicyandiamide or melamine pyrophosphate. The entire composition may thus be organic in nature and contain solely materials of low water solubility.

Among the halogen-containing, organic, film-forming materials which may be employed are chlorinated rubber; rubber hydrochloride; polymers and copolymers of vinyl chloride, particularly those containing 5% by weight or more of combined vinyl chloride, such as polyvinyl chloride itself and copolymers of vinyl chloride with vinyl acetate or other vinyl esters; polymers and copolymers of vinylidene chloride, particularly those containing 5% or more of combined vinylidene chloride, including copolymers of vinylidene chloride with vinyl chloride or with vinyl acetate or other vinyl esters; polychloroprene; and like materials which have relatively high molecular weights, are capable of forming films, are thermally unstable, and which liberate hydrogen chloride when subjected to elevated temperatures of the order of 125° to 400° C. or even higher.

In some cases it may be desirable to employ with the halogen-containing, film-forming ingredient a liquid plasticizer in order to increase the film-forming tendencies of the ingredient and to soften the resultant film. Particularly preferred for this purpose are liquid ester-type plasticizers such as tricresyl phosphate, dioctyl phthalate, dibutyl phthalate, butyl phthalyl butyl glycollate, and the like. Dyes, fillers, pigments and other conventional compounding ingredients may also be present in the composition if desired.

The polyhydroxy alcohols which may be employed as the carbonaceous material include pentaerythritol, sorbitol, mannitol, dipentaerythritol, tripentaerythritol, and other similar saturated open-chain polyhydroxy alcohols having from five to fifteen carbon atoms and from four to eight hydroxyl groups. Preferably, the alcohol contains only carbon, hydrogen and oxygen present in hydroxyl or ether groups.

The relative proportions of halogen-containing, film-forming material, polyhydroxy alcohol, and water-insoluble organic spumific may vary over a wide range. In general the ratio of film-forming material to alcohol may be from 3:1 to 1:3 by weight, although best results are obtained in the range from 1:1.5 to 1:2 by weight. The ratio of film-forming material to spumific may likewise vary from 3:1 to 1:3 by weight, but is preferably within the range from 1:1 to 1:2 by weight.

The following specific examples are intended to illustrate more fully the nature of the invention, but are not intended as a limitation upon its scope.

*Example 1*

To 100 parts by weight of a 15% solution in xylene of chlorinated rubber (67% chlorine) there were added 23 parts by weight of tripentaerythritol and 23 parts by weight of dicyandiamide.

A steel panel coated with a lead oxide primer was painted (brushed) with the foregoing composition (1 gallon/100 sq. ft.) and dried at room temperature, then used as a closure for a muffle furnace heated at 1650° F. with the painted face exposed directly to the heat. A thermocouple mounted at the face of the panel remote from the furnace showed that it required 12 minutes' exposure for the temperature at the face of the panel to reach 1000° F. When an identical primer-coated panel, free from the coating of the present invention, was exposed under the same conditions, only 1½ minutes' exposure was required for the face of the metal to reach a temperature of 1000° F.

The exposed face of the metal treated in accordance with the present invention exhibited a blackened, charred or carbonized appearance with the characteristic puff resulting from intumescence.

In similar fashion wood, fabric and other combustible materials coated or impregnated with the foregoing composition and allowed to dry exhibited remarkable resistance to heat and to burning.

Similar results are obtained when melamine pyrophosphate is substituted for dicyandiamide.

*Example 2*

A composition was prepared by mixing together 100 parts by weight of a 15% by weight solution of chlorinated rubber (67% chlorine) in xylene, 9 parts of dipentaerythritol, and 30 parts of dicyandiamide. The composition was readily applied to surfaces to be protected by brushing or dipping and when dry the coating was highly effective in retarding the transmission of heat and the propagation of flame.

As in the case of Example 1, melamine pyrophosphate could be substituted for dicyandiamide.

*Example 3*

A composition was prepared which was identical with that of Example 2 except that the dipentaerythritol was replaced with an equal weight of pentaerythritol. The composition was similar to that of Example 2 in effectiveness.

*Example 4*

A composition was prepared which was identical with that of Example 2 except that the dipentaerythritol was replaced with an equal weight of mannitol.

*Example 5*

A composition was prepared which was identical with that of Example 2 except that the dipentaerythritol was replaced with 40 parts by weight of tripentaerythritol, and 5 parts by weight of dicyandiamide were employed instead of 30. Although this composition appeared to be foamed somewhat less than the others described above upon exposure to elevated temperatures, it was nevertheless quite effective. Somewhat better foaming could be obtained by increasing the quantity of dicyandiamide to 10 parts by weight.

*Example 6*

A composition was prepared by mixing together 100 parts by weight of a 25% by weight solution in toluene of a vinyl acetate-vinyl chloride copolymer (VYHH), 40 parts by weight of tripentaerythritol, and 10 parts by weight of dicyandiamide. When coated on metal or other surfaces to be protected it produced substantially the same results as the composition of Example 1. Similar results were obtained when polychloroprene, vinyl chloride-vinylidene chloride copolymers, and other halogen-containing copolymers and other halogen-containing, film-forming materials were employed in place of the vinyl acetate-vinyl chloride copolymer. When polyvinyl chloride or vinylidene chloride polymers were employed as the film-forming material it was found desirable to include a conventional liquid ester-type plasticizer in an amount sufficient to provide a film of the desired strength and toughness, as is well known in the art.

*Example 7*

The following composition was prepared in which the parts are by weight:

|  | Parts |
|---|---|
| Chlorinated rubber (67% chlorine) | 50.0 |
| Tricresyl phosphate | 25.0 |
| Aromatic hydrocarbon solvent | 125.0 |
| Turpentine | 125.0 |
| Stabilizer | 2.5 |
| Tripentaerythritol | 90.0 |
| Dicyandiamide | 75.0 |

After thorough milling, the composition was in the form of a paint which could be applied to the surface to be protected in any conventional manner. It provided substantially the same results as the composition of Example 1 when exposed to elevated temperatures. Other chlorinated rubbers containing from 35% to 68% by weight of chlorine may be employed with the same results.

Although specific embodiments of the invention have been described herein, it is not intended to limit the invention solely thereto, but to include all of the obvious variations and modifications within the spirit and scope of the appended claims.

I claim:

1. A weather-resistant fire-retardant paint free from water-soluble ingredients comprising a film-forming, chlorine-containing organic polymer of an ethylenically unsaturated monomer which polymer liberates hydrogen chloride upon exposure to an elevated temperature from 125° to 400° C., a saturated open chain polyhydroxy alcohol containing from 5 to 15 carbon atoms and from 4 to 8 hydroxyl groups, a hydrocarbon solvent, and a member of the class consisting of dicyandiamide and melamine pyrophosphate.

2. A weather-resistant fire-retardant paint as defined in claim 1 in which said film-forming organic polymer comprises a copolymer of vinyl chloride and vinyl acetate containing at least 5% by weight of combined vinyl chloride.

3. A weather-resistant fire-retardant paint as defined in claim 1 in which said film-forming organic polymer comprises chlorinated rubber.

4. A weather-resistant fire-retardant paint as defined in claim 1 in which said film-forming organic polymer comprises a homopolymer of vinyl chloride.

5. A weather-resistant fire-retardant paint as defined in claim 1 in which said alcohol comprises a member of the class consisting of dipentaerythritol and tripentaerythritol.

6. A weather-resistant fire-retardant paint as defined in claim 1 in which said alcohol comprises tripentaerythritol.

7. A weather-resistant fire-retardant paint free from water-soluble ingredients comprising chlorinated rubber, tripentaerythritol, a hydrocarbon solvent and dicyandiamide.

8. A weather-resistant fire-retardant paint free from water-soluble ingredients comprising a homopolymer of vinyl chloride, tripentaerythritol, a hydrocarbon solvent and dicyandiamide.

9. A weather-resistant fire-retardant paint free from water-soluble ingredients comprising chlorinated rubber, tripentaerythritol, a hydrocarbon solvent and melamine pyrophosphate.

10. A weather-resistant fire-retardant paint free from water-soluble ingredients comprising a homopolymer of vinyl chloride, tripentaerythritol, a hydrocarbon solvent and melamine pyrophosphate.

References Cited in the file of this patent

UNITED STATES PATENTS

| 2,628,946 | Juda et al. | Feb. 17, 1953 |
| 2,702,283 | Wilson et al. | Feb. 15, 1955 |
| 2,755,260 | Stilbert et al. | July 17, 1956 |

FOREIGN PATENTS

| 514,329 | Canada | July 5, 1955 |